Patented June 9, 1942

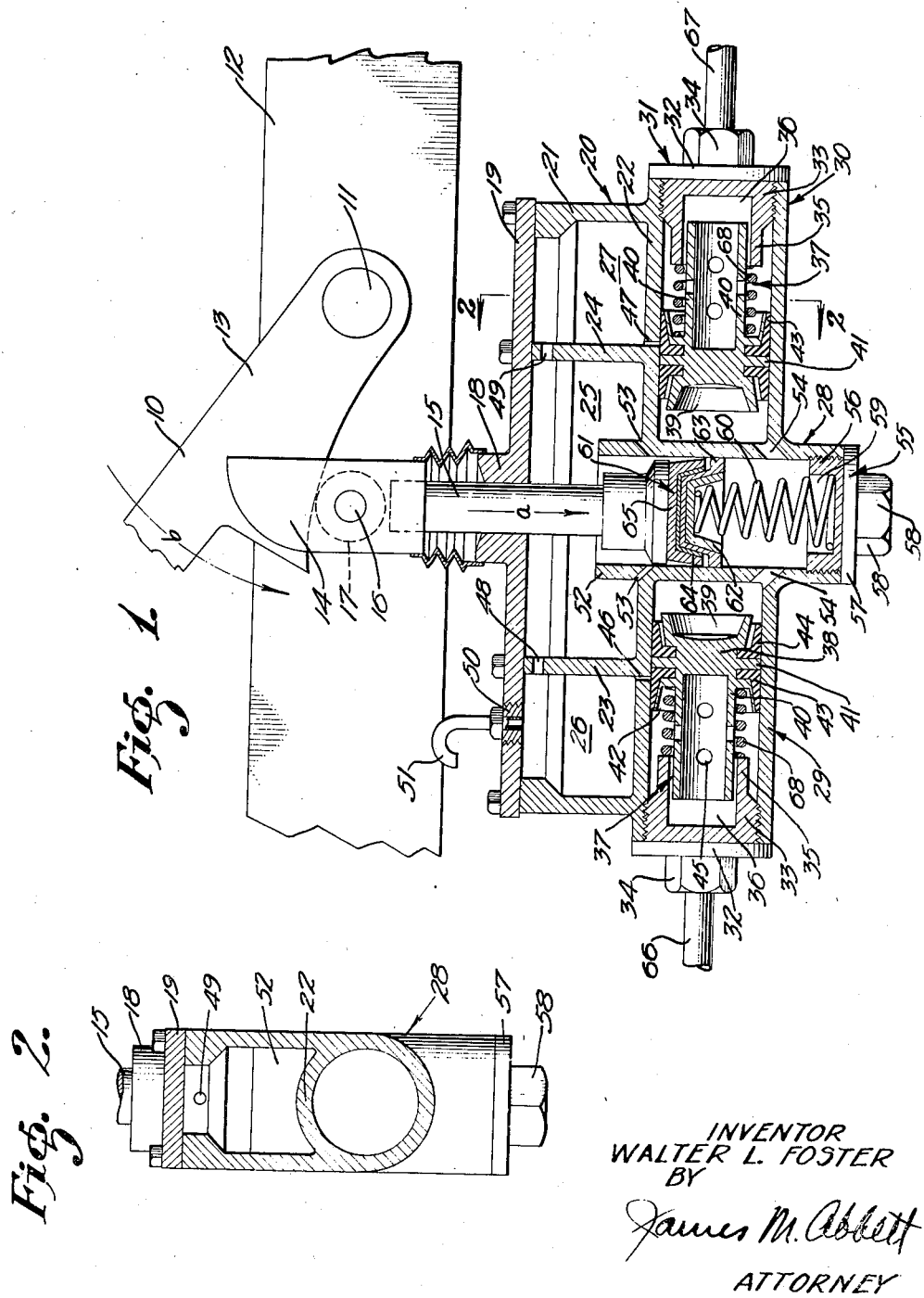

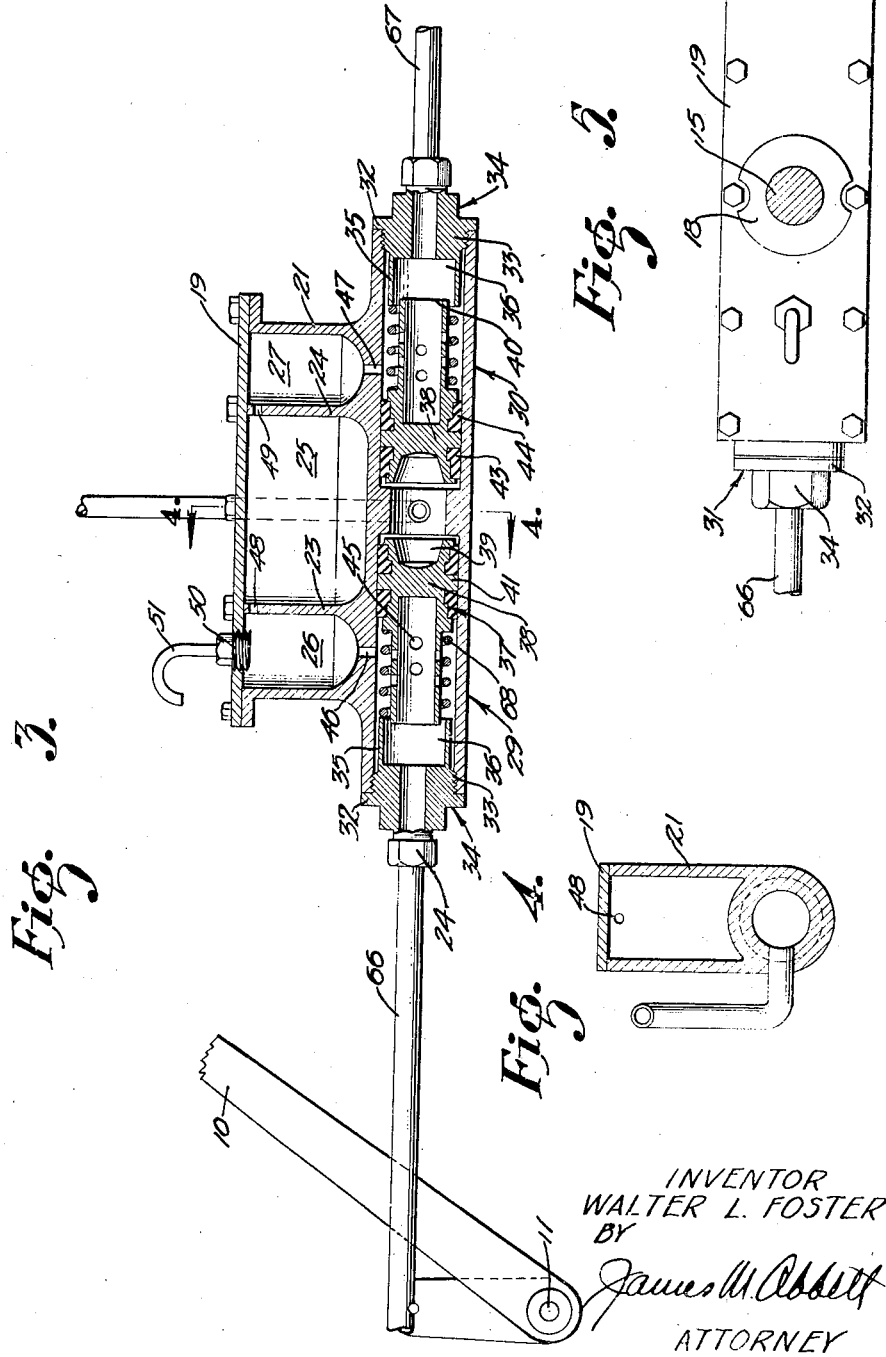

2,285,703

UNITED STATES PATENT OFFICE 2,285,703

HYDRAULIC BRAKE MECHANISM

Walter L. Foster, Whittier, Calif.

Application December 26, 1939, Serial No. 310,966

3 Claims. (Cl. 60—54.5)

This invention relates to the construction of automobiles and the like, and particularly pertains to a hydraulic brake mechanism.

In the design and construction of automobiles at the present time it is common practice to equip the automobile with brakes having shoes which are set by hydraulic means instead of by mechanical means. In such structures the brake foot pedal actuates pressure creating means for acting upon an incompressible fluid and causing it to transmit a pressure force to the brake shoe operating mechanism. Such structures thus include the use of cylinders, pistons and tubular lines through which fluid under pressure passes. It sometimes occurs in connection with mechanism of this type that an air lock exists in the line or that a leak occurs, in either of which events pressure upon the brake pedal will not produce a responsive action of the brake shoe mechanism, thus resulting in disastrous accidents. It is the principal object of the present invention, therefore, to provide a hydraulic brake unit which will insure that the cylinders of the mechanism are at all times filled with an incompressible fluid, and that transmission of pressure through the lines will be maintained in all normal conditions and during such times as a leak may occur.

The present invention contemplates the provision of a reservoir for an incompressible fluid, and which reservoir is associated with cylinders carrying pistons, the cylinders being formed with ports by which it is insured that at all times an incompressible fluid will be maintained within the cylinders and the lines leading therefrom in sufficient quantities to produce operation of the brakes, and that the various valves and operating elements will continue to function under all normal working conditions.

The invention is illustrated by way of example in the accompanying drawings in which:

Figure 1 is a view in central longitudinal section showing one form of the present invention with the moving parts in an intermediate position.

Fig. 2 is a view in transverse section through the structure as seen on the line 2—2 of Fig. 1.

Fig. 3 is a view in longitudinal section showing another form of the invention with the moving parts in their innermost positions.

Fig. 4 is a view in transverse section showing the structure as seen on the line 4—4 of Fig. 2.

Fig. 5 is a view in plan showing the structure as seen in Figure 1 and the conduits leading therefrom.

Referring more particularly to Fig. 1 of the drawings, 10 indicates the lower portion of a brake pedal which is mounted on a suitable pivot 11 carried by the frame 12. The lower face of the brake pedal is formed with a cam surface 13 which extends between the arms of a fork 14. The fork 14 is mounted upon the upper end of a plunger rod 15. This fork is provided with a pivot pin 16 which extends transversely of its crotch and upon which a roller 17 is mounted. The plunger rod 15 extends downwardly through a bearing 18 in a cover plate 19 of a hydraulic valve housing 20. The hydraulic valve housing is formed at its upper end with a rectangular wall 21 which receives the cover plate 19. A floor 22 cooperates with the side wall 21 and carries vertical partition walls 23 and 24. By this structure a central reservoir 25 is formed as well as end reservoirs 26 and 27.

The bearing 18 occurs in the portion of the cover plate 19 between the vertical walls 23 and 24. Disposed in longitudinal alignment with the bearing 18 and carried by the floor 22 is a vertical cylinder 28, at the opposite sides of which are horizontal cylinders 29 and 30 disposed in longitudinal alignment and at right angles to the longitudinal axis of the vertical cylinder 28. The outer ends of the cylinders 29 and 30 are fitted with removable cylinder heads 31. These heads include an outer plate 32 which bears against the end of the cylinders and formed integral with which is a tubular threaded extension 33 which is screwed into the end of the cylinder to close the same. For convenience in screwing a hexagonal head 34 is formed on the head of each of the plugs 31. The innermost end of the extension 33 of each of the plugs 31 is reduced in diameter as indicated at 35 to provide a fluid space therearound while the central portion of each of the plugs is formed with a cylindrical bore 36 which faces inwardly.

Mounted to reciprocate within each of the cylinders 29 and 30 is a piston structure 37. The piston structure 37 comprises a body portion 38 formed at its forward end with a cup 39 and a tubular portion 40. The tubular portion 40 extends into the bore 36 of the plugs 31. At a point intermediate the ends of the tubular portion is a shoulder flange 41 and a cup 42 which is oppositely disposed from the cup 39. Spaces occurring between the shoulders on the cups and the shoulder flange accommodate packing cups 43 and 44 which are stretched over the cups to thereafter be contracted into their seated positions. These packing cups extend in opposite directions over the cups 39 and 42 of the piston structure. Formed through the walls of the tubular extension 40 are openings 45. The outermost ends of each of these tubular extensions are completely opened and extend into the bore 36 of the plugs. Formed adjacent to the partition walls 23 and 24 and through the floor 22 of the reservoir structure are ports 46 and 47 which establish communication between the reservoirs 26 and 27, respectively, with the cylinders 29 and 30, the purpose for which construction will be described hereinafter. It is to be understood that the entire reservoir structure including the compartments 25, 26 and 27 are filled with an incompressible fluid which may flow through the ports 46 and 47 and into the cylinders 29 and 30. The partitions 23 and 24 are formed with openings 48 and 49, respectively, which establish communication with the intermediate reservoir 25 so that at all times the reservoirs 26 and 27 may have sufficient incompressible fluid for operation. At some point on the cover 19, and as shown in Fig. 1 of the drawings, over the compartment 26 is a threaded plug 50 carrying an air vent tube 51 so that there will not be any air lock in the device.

The intermediate vertical cylinder 28 has a skirt portion 52 which extends upwardly above the floor 22 of the reservoir 25. Ports 53 extend downwardly and inwardly into the cylinder 28 from said reservoir. The lower end of the cylinder 28 extends below the level of the cylinders 29 and 30 and ports 54 extend downwardly and inwardly from the cylinders 29 and 30 into the cylinder 28. The lower end of the cylinder 28 is provided with a closing plug 55. This has a threaded extension 56 which is screwed into the lower end of the cylinder 28 and has associated with it a flange 57 adapted to be tightly held against the end of the cylinder and a hexagonal shaped head 58 to facilitate in screwing. The plug is fitted with a recessed counterbore 59 which receives a spiral spring 60. The base of the spring rests within the counterbore and the reduced end rests against the under face of the plunger structure 61 which is carried at the lower end of the plunger rod 15. This plunger structure includes an inner cup 62 which is concaved and has an outwardly and downwardly tapering wall section. Over this cup is a packing cup 63 which fits upon the cup and has an outer circular flange portion engaging the wall of the cylinder 28. Nested over the central portion of the cup 63 is a metal cup 64. It is to be understood that the cup 63 is of non-metallic material and forms a fluid seal with the side wall of the cylinder 28. Fitting over the cup 64 is a metal cup 65 which is carried at the lower end of the plunger 15 and tends to support and reinforce the various cup members. Attention is called to the fact that the laminated construction of the various cups forming the plunger insures that if the outer packing cup 63 is blown off the inner cup 63 will tend to complete the fluid seal, and that in any event the intermediate metal cup 64 will reinforce the structure to insure against a blow-out.

As shown in Fig. 5 of the drawings, feed lines 66 and 67 communicate with the cylinders 29 and 30, respectively, to conduct the incompressible fluid from the cylinders to the brake control apparatus at the front and rear brakes.

Referring more particularly to Fig. 3 of the drawings, a modification of the present invention is shown which is particularly adapted for use in changing present hydraulic brake installations to embody the construction of the invention. In this particular device the central cylinder 28 and its plunger 61 are eliminated. Otherwise the parts are substantially the same and are given the same reference numerals as those previously described and designated on Figs. 1, 2 and 5. In both structures it will be evident that there will not be any air lock due to the presence of the air vent 51, and that under any and all conditions the incompressible fluid will be constantly supplied to the reservoirs.

In operation of the present invention the structure is assembled in its preferred form, as shown in Fig. 1 of the drawings. The conduits 66 and 67 are connected to the usual operating mechanism of the front and rear brakes. The entire system is filled with an incompressible fluid such as oil. This also fills the reservoirs 25, 26 and 27. When the brake pedal 10 is depressed it moves the plunger rod 15 downwardly in the direction of the arrow *a*, as indicated in Fig. 1. In its innermost position the plunger 61 is elevated by the spring 60 to a point indicated by dotted lines in Fig. 1. At such a time the ports 53 are uncovered and communicate with the cylinder 28. This insures that at each actuation of the brake mechanism the cylinder 28 is filled with oil. At the same time the cylinders 29 and 30 are filled with oil since the forward packing cups 43 will move back to uncover the ports 46 and 47. This insures that the reservoirs 26 and 27 will continuously fill and replenish the cylinders 29 and 30 with an incompressible fluid or by operation of the brake mechanism will be properly effected. When the brake pedal 10 is depressed and swings in the direction of the arrow *b*, as seen in Fig. 1, the plunger 61 will move downwardly, forcing fluid out of the cylinder 28 and through the ports 54 into the cylinders 29 and 30. As the plunger 61 moves downwardly it will pass below the ports 53 to seal off the reservoir 25. As this fluid is forced from the cylinder 28 it will act against the ends of the piston structure 37 and simultaneously force both of these piston structures outwardly in the cylinders 29 and 30 and toward the plugs 31 at the opposite ends thereof. The fluid entrapped between the ends of cylinders 29 and 30 will be forced through the conduits 66 and 67 and will exert a force at the brake operating mechanism (not shown in the drawings) to actuate the brake. It is to be understood that as shown by solid lines in Fig. 1 the pistons 37 are in intermediate positions. After the braking operation has been produced the pressure on the foot pedal 10 is relieved. This will permit the spring 60 to restore the plunger 61 to its uppermost position within the cylinder 28 while the pistons 37 are returning to their innermost positions within the cylinders 29 and 30. The pistons are restored to their innermost positions by springs 68. When the pistons are in their innermost positions and the plunger 61 is in its uppermost position the ports 46 and 47 will be in communication with the cylinders 29 and 30, and the ports 53 will be in communication with the cylinder 28. This will insure that all of the cylinders will be placed in communication with the reservoir compartments 25, 26 and 27 so that any of the fluid which has been dissipated or lost from the conduits of the brake operating mechanism will be replenished before the next reciprocation of the plunger 61.

It will furthermore be seen that due to the fact that an air vent is provided for the fluid compartments there will be no possibility of an air lock in any of the lines since upon the return stroke of the two pistons and the plunger communication will be established through the vent 51 to the outside air.

Another feature of the invention is concerned with the packing for the plunger 61. It will be seen that the metal cap which fits over the non-metallic packing cup 63 will act to reinforce this cup and to prevent it from becoming ruptured under excessive pressure.

From the foregoing description of the present invention it will be evident that the brake operating mechanism here shown is simple in construction and operation and at the same time provides means for insuring that the hydraulic operating lines will at all times be filled with the incompressible fluid used and that the lines will be free from air which might lock them.

Attention is directed to the fact that the proportions of the piston structures 37 are such that their length will limit their movement within the cylinders. Therefore, when the pistons 37 are in their normal and innermost position the ports 46 and 47 will be uncovered to permit fluid to flow from the reservoirs 26 and 27, respectively, and into the cylinders 29 and 30 and from thence into the lines 66 and 67. When the pistons are at the extreme length of their stroke within the cylinders their tubular extensions 40 will abut against the inner end of the bores 36 and will thus limit the movement of the piston and at the same time maintain the ports 46 and 47 closed. This will insure that should an air lock or leakage occur in the operating line to one set of brakes the other set of brakes will maintain normal operation so that if the front set of brakes or the rear set of brakes should be separately out of commission the remaining set would operate.

It is further to be pointed out that while the structure here disclosed insures that the cylinders will at all times be filled and replenished with the incompressible fluid it is also true that on each stroke of the plungers and pistons as they return to their normal and retracted positions compensation may be had for variation in volume of the fluid in the lines since the heating of the parts of the apparatus and the oil will cause expansion and may result in increasing the quantity of fluid sufficiently to be a detriment unless it is free to escape into the reservoir as is possible with the present construction.

While I have shown the preferred form of my invention as now known to me, it will be understood that various changes may be made in combination, construction, and arrangement of parts by those skilled in the art, without departing from the spirit of my invention as claimed.

Having thus described my invention, what I claim and desire to secure by Letters Patent is:

1. Operating mechanism for hydraulic brakes and the like, comprising a central vertical cylinder, a piston reciprocating therein, the upper end of said cylinder being open and the lower end of said cylinder being closed, a pair of horizontal cylinders axially aligned and disposed one on each side of the vertical cylinder and in the vertical plane thereof, the lowermost wall of said horizontal cylinders being above the plane of the lower end of the vertical cylinder, communicating ports through the walls of the vertical cylinder and at points adjacent to the inner ends and lowermost sides of the horizontal cylinders, pistons mounted to reciprocate within said horizontal cylinders, spring members tending to force said pistons to their retracted positions in the ends of the cylinders adjacent to the vertical piston, a central reservoir in constant communication with the vertical cylinder at a point below the upper limit of the up-stroke of the piston therein, and side reservoirs, one at each side of said central reservoir and in constant communication therewith, each of said reservoirs having a port in each lower wall communicating with the interior of one of the horizontal cylinders and at a point whereby communication between the cylinders and the side reservoirs will be established while the pistons are in their extreme positions, whereby liquid from the reservoirs may flow freely into the horizontal cylinders.

2. Operating mechanism for hydraulic brakes and the like, comprising a central vertical cylinder, a piston reciprocating therein, the upper end of said cylinder being open and the lower end of said cylinder being closed, a pair of horizontal cylinders axially aligned and disposed one on each side of the vertical cylinder and in the vertical plane thereof, the lowermost wall of said horizontal cylinders being above the plane of the lower end of the vertical cylinder, communicating ports through the walls of the vertical cylinder and at points adjacent to the inner ends and lowermost sides of the horizontal cylinders, pistons mounted to reciprocate within said horizontal cylinders, spring members tending to force said pistons to their retracted positions in the ends of the cylinders adjacent to the vertical piston, a central reservoir in constant communication with the vertical cylinder at a point below the upper limit of the up-stroke of the piston therein, side reservoirs, one at each side of said central reservoir and in constant communication therewith, each of said reservoirs having a port in each lower wall communicating with the interior of one of the horizontal cylinders and at a point whereby communication between the cylinders and the side reservoirs will be established while the pistons are in their extreme positions, whereby liquid from the reservoirs may flow freely into the horizontal cylinders, and an air vent establishing communication between the reservoirs and atmosphere.

3. Hydraulic operating means for brakes and the like, comprising a vertical cylinder, a piston reciprocating therein, spring means normally urging the piston to its uppermost position, the lower end of said cylinder being closed and the upper end being open, a piston rod extending upwardly from the end of said vertical cylinder, a bearing for said piston rod supported in spaced relation to the upper end of the cylinder, whereby the piston rod is guided without obstructing the upper opened end of the cylinder, a central liquid reservoir at the upper end of said cylinder and having a floor in a plane lower than the plane of the upper end of said vertical cylinder, communicating ports between the reservoir and the cylinder in the horizontal plane of the floor of the reservoir, said ports being disposed in a horizontal plane below the uppermost end of the stroke of the piston within the vertical cylinder, whereby liquid from the reservoir may drain downwardly into the vertical cylinder and around the piston at all times, a pair of horizontal cylinders, one disposed at each side of the vertical cylinder in longitudinal axial alignment and in the same vertical plane as the vertical cylinder, the lower edges of the walls of the horizontal cylinders being in a plane above the lower end of the vertical cylinder, communicating ports between the inner ends of the horizontal cylinders and the vertical cylinder along their lower edges, whereby liquid from the inner ends of the horizontal cylinders may drain into the vertical cylinder, pistons, one for each of said horizontal cylinders, said pistons being normally retracted and disposed within the inner ends of the horizontal cylinders, spring means tending to urge said pistons to their retracted positions, reservoirs for said cylinders and disposed above the same, and ports within said reservoirs whereby liquid from the reservoirs may drain into the horizontal cylinders, said ports being disposed so that they will be closed by the pistons during the operating stroke of the pistons and opened at opposite ends of said stroke.

WALTER L. FOSTER.